May 26, 1959  E. CROSIO  2,887,716
APPARATUS FOR THE MANUFACTURE OF HOLLOW ARTICLES
COMPOSED OF A PLASTIC MATERIAL
Filed June 18, 1956  5 Sheets-Sheet 1
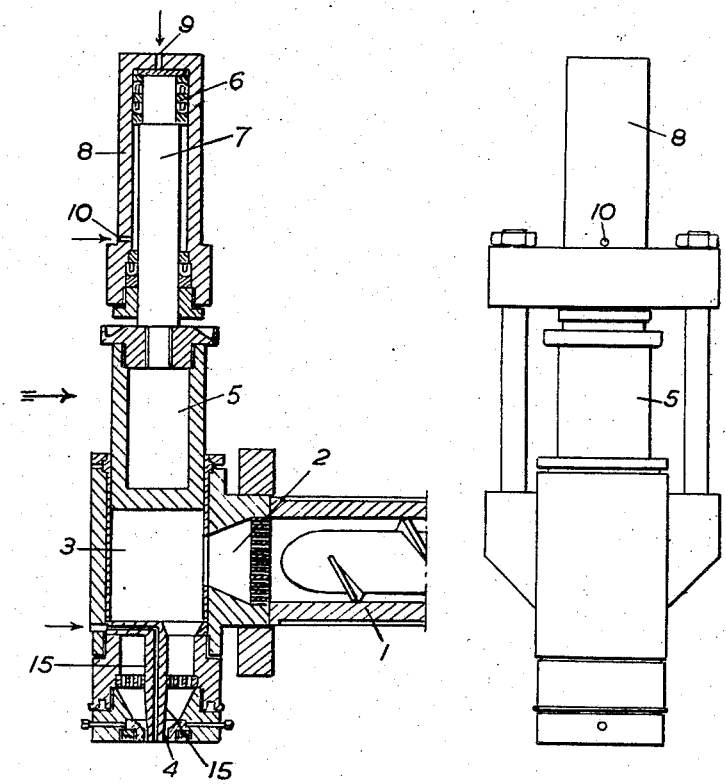
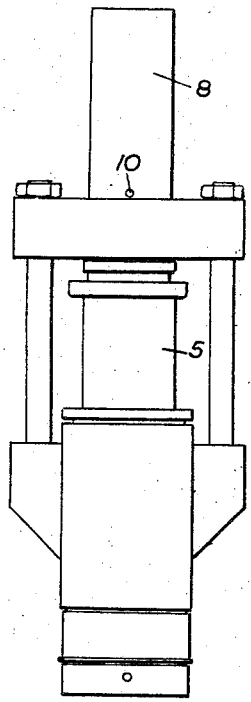
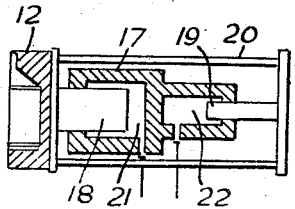
INVENTOR
ENRICO CROSIO
BY
Watson, Cole, Grindle + Watson
ATTORNEYS

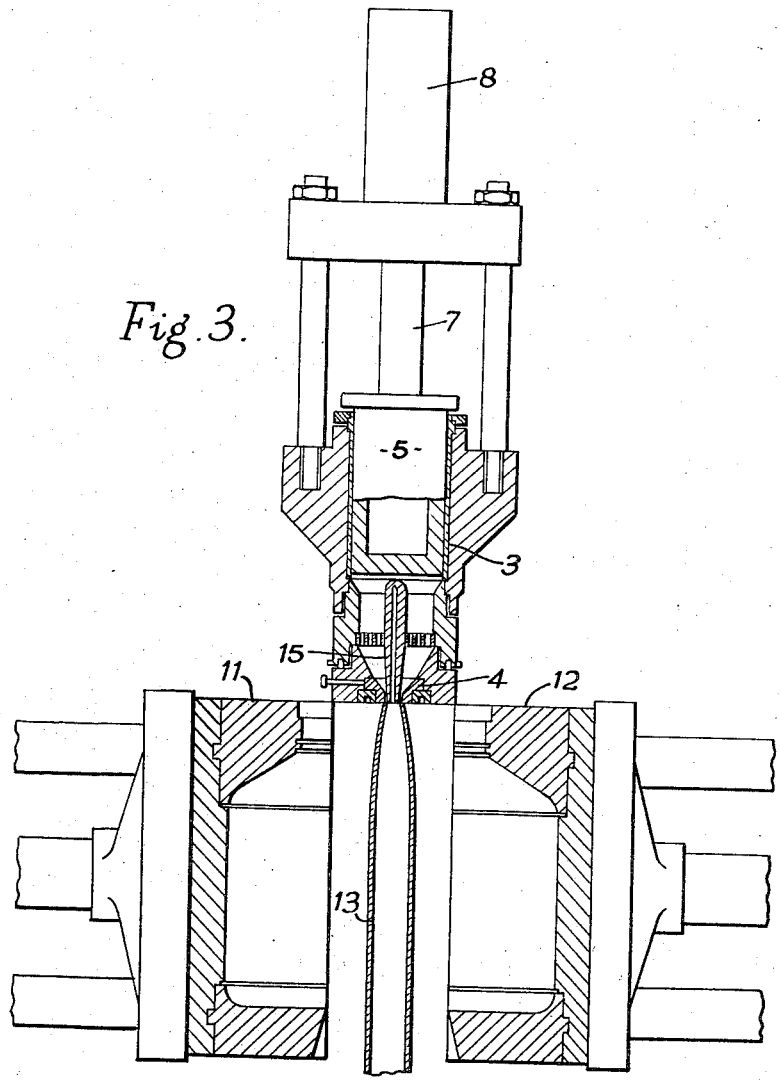

May 26, 1959 E. CROSIO 2,887,716
APPARATUS FOR THE MANUFACTURE OF HOLLOW ARTICLES
COMPOSED OF A PLASTIC MATERIAL
Filed June 18, 1956 5 Sheets-Sheet 4
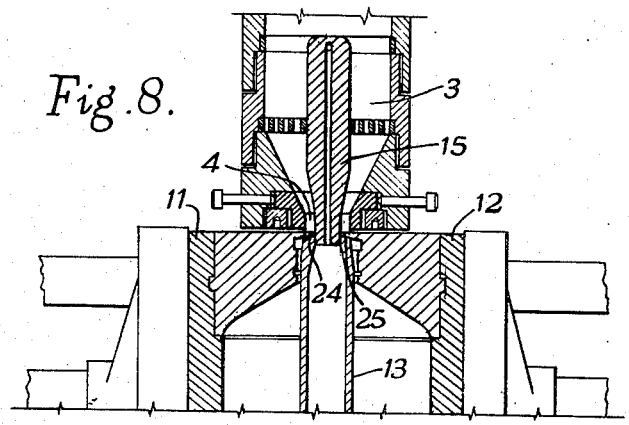
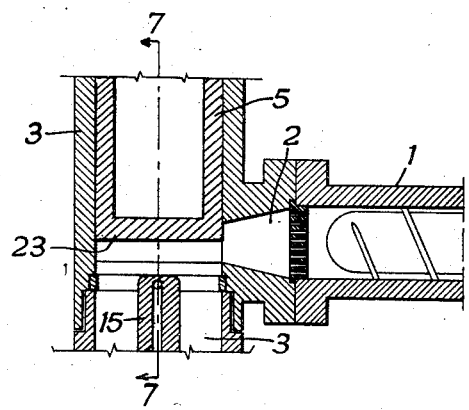
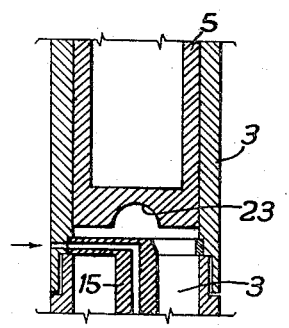
INVENTOR
ENRICO CROSIO
BY
Watson, Cole, Grindle and
Watson ATTORNEYS May 26, 1959 E. CROSIO 2,887,716
APPARATUS FOR THE MANUFACTURE OF HOLLOW ARTICLES
COMPOSED OF A PLASTIC MATERIAL
Filed June 18, 1956 5 Sheets-Sheet 5
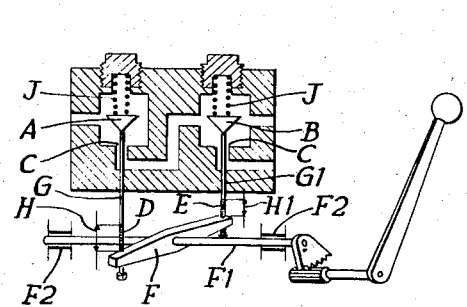
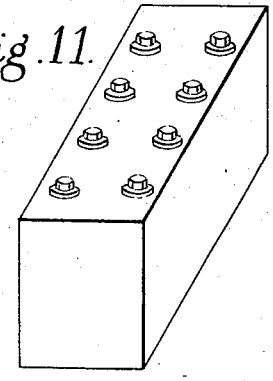
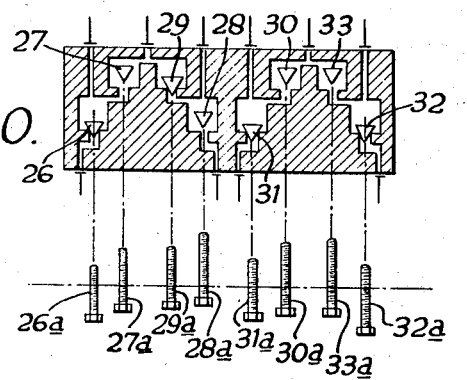
INVENTOR
ENRICO CROSIO
BY
Watson, Cole, Grindle & Watson
ATTORNEYS

United States Patent Office 2,887,716
Patented May 26, 1959

2,887,716

APPARATUS FOR THE MANUFACTURE OF HOLLOW ARTICLES COMPOSED OF A PLASTIC MATERIAL

Enrico Crosio, Milan, Italy, assignor to Pirelli Societa per Azioni, Milan, Italy, a company of Italy Application June 18, 1956, Serial No. 592,128

Claims priority, application Italy May 5, 1951

5 Claims. (Cl. 18—5)

This application is a continuation-in-part of application Serial No. 283,728 filed April 22, 1952, now abandoned, and its subject matter relates to an apparatus for blow molding plastic containers of large size as later defined.

The term "plastic" as used throughout the present specification and in the claims appended thereto connotes either a thermoplastic material such, for example, as polyethylene.

Typical of containers of "large" size, in the sense in which such containers are referred to in the present specification and in the claims appended thereto, are containers whose capacity is in the neighbourhood of 50 litres (14 United States gallons) and whose weight may be several kilogrammes. Such containers are very considerably larger than those which it has been found possible to produce by known forms of blow molding apparatus, and the object of the present invention is to provide a novel form of blow molding apparatus with which they may be produced efficiently and rapidly.

According to the invention, such an apparatus comprises a horizontally disposed continuously operating worm type plastifier-extruder, a vertically disposed accumulator cylinder in which plastified material delivered thereinto from the plastifier-extruder during the continuous operation thereof accumulates between successive downward strokes of a piston working in the cylinder and operative periodically to extrude therefrom through a downwardly directed tubing die located at the bottom of the cylinder a measured quantity of the plastified material in the form of a depending tube thereof hanging vertically from the outlet of the die, the outlet of the plastifier-extruder communicating directly and without the intervention of any cut-off means with a lateral inlet in the wall of the accumulator cylinder, the through-way of the tubing die communicating directly and without the intervention of any cut-off means with the interior space of the accumulator cylinder and the downward strokes of the piston being completed rapidly and being followed immediately by the upward strokes of the piston, a split mold located in the path of delivery of said tube from said die with its joint coincident with the axis of the die, the sections of said mold being horizontally movable to open and close the mold, means on said sections effective to cut off an excess portion of the tube at the lower end thereof, at the same time uniting the edges of the tube at the cut, while leaving the tube unclosed at the upper end, and a nozzle for the delivery of a fluid under pressure into the tube by way of said unclosed end thereof after the mold has closed about it, said nozzle extending into the through-way of the tubing die and said fluid being effective to expand the tube into contact with the interior surfaces of the mold.

Further according to the invention, the arrangement may be one in which both the piston working in the accumulator cylinder, at least as regards the downward (extrusion) stroke thereof, and the mould sections are hydraulically operated and the movements of the piston on the one hand and the mould sections on the other are automatically controlled in timed relation to one another through the intermediary of a single control unit operative to control the flow of the hydraulic fluid to the parts.

According to a generally preferred form of the invention the piston is hydraulically operated only through its downward (extrusion) stroke, being raised (following the completion of the downward stroke) by thrust from the plastified material accumulating in the accumulator cylinder.

The invention will now be further described with reference to the accompanying drawings, which illustrate a form of apparatus suitable for carrying the method according to the invention into effect, said form being substantially the form disclosed in the aforesaid application Serial No. 283,728.

In the drawings:

Figure 1 is a vertical axial section through a part of the apparatus, the view omitting the mould element of the apparatus and showing only a portion of the plastifier-extruder element, at the end thereof adjacent the accumulator cylinder;

Figure 2 is an external view of the part of the apparatus shown in Figure 1, looking in the direction of the arrow appearing in that figure;

Figure 3 is partly an external elevation and partly an axial section through the apparatus, looking in the direction of the arrow in Figure 1 and showing, in addition to the parts which appear in that figure and in Figure 2, the two halves of the split mould of the apparatus;

Figure 4:
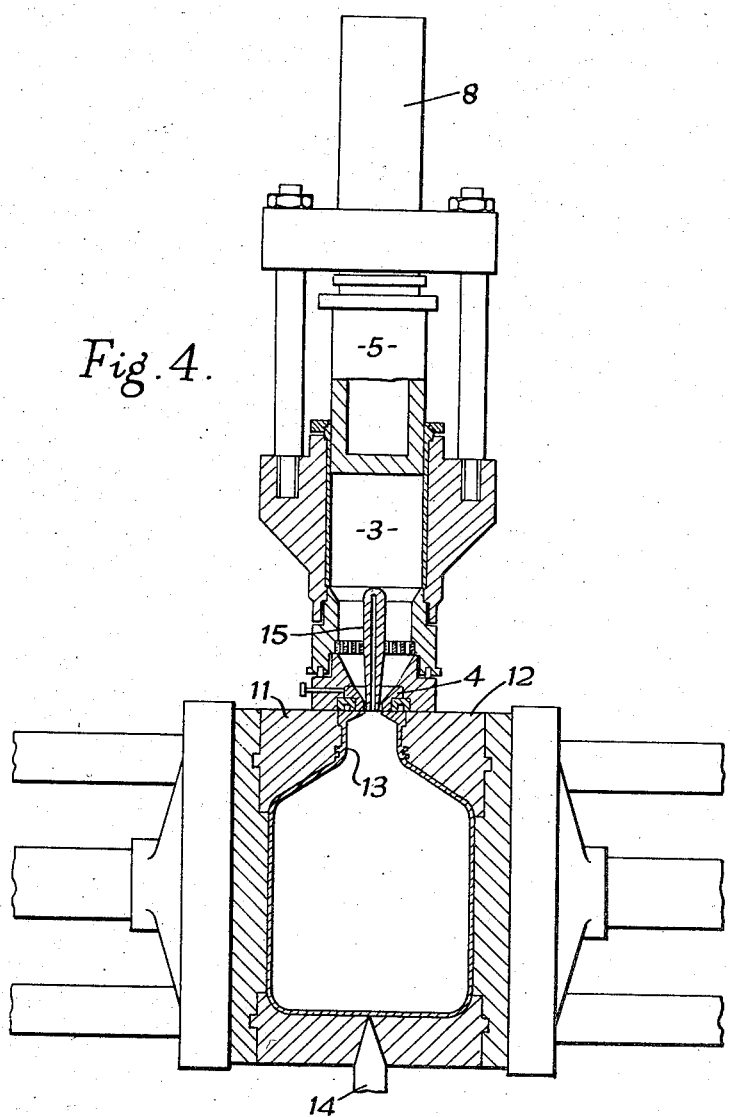
Figure 4 is a view similar to Figure 3, showing the extrusion piston of the apparatus in the raised position, the mould in the closed condition and the tube which has been extruded from the accumulator cylinder in the expanded condition, Figure 3 showing the piston in the lowered position, the mould in the open condition and the tube in the as-extruded (uncut and unexpanded) condition.

Figure 5 shows diagrammatically one of the mould halves, namely the right hand half in Figures 3 and 4, and its hydraulic actuating means, in the positions these parts occupy when the mould is open, it being understood that the opposite mould half and its actuating means is identical to the right hand half and its actuating means, the apparatus being symmetrical in this respect, and that the two mould halves are movable through their outward strokes simultaneously and similarly through their inward strokes simultaneously;

Figure 6 is a view similar to Figure 1, but somewhat more fragmentary, illustrating a modification of the apparatus according to which, as above described, the extrusion piston of the apparatus is hydraulically operated only through its downward stroke, being raised by thrust from the plastified material accumulating in the accumulator cylinder;

Figure 7 is a vertical section through the part of the apparatus shown in Figure 6, taken on the section line 7—7 of that figure;

Figure 8 is a view similar to Figure 3, but again somewhat more fragmentary, also illustrating the aforesaid modification, together with a further feature according to which the mould sections carry at the top thereof means for severing the extruded tube depending from the outlet of the tubing die, from the mass of the plastified material occupying the interior space of the die, said means coming into operation during a final phase in the closing movement of the mould sections;

Figure 9 is a view, largely diagrammatic, illustrating one possible form of control unit for the apparatus as hereinbefore referred to, for controlling the movements of the extrusion piston and the two mould halves;

Figure 10 is a sectional view, also largely diagrammatic, of such a unit, the unit in this case being designed to control also (a) the admission of fluid under pressure (e.g. air) to the extruded tube and the discharge of said fluid from the interior of the expanded tube in position in the closed mould and (b) the starting and stopping when necessary (i.e. during the course of an operating cycle of the apparatus) of the plastifier-extruder element of the apparatus; and Figure 11 is an external view of the control unit illustrated in Figure 10.

Like reference numerals are applied to like parts in the various figures.

The apparatus shown in Figures 1 to 4 comprises a horizontally disposed continuously operating extruder 1 having an extrusion head 2. The extruder is adapted to plastify the material prior to its extrusion through the head 2.

Connected directly to the extrusion head 2 is a vertically disposed accumulator cylinder 3 into which the plastic material is delivered from the plastifier-extruder 1, the material accumulating in the cylinder pending its extrusion therefrom in measured quantities by way of a tubing die 4 forming an outlet from the cylinder at the lower end thereof.

Working in the accumulator cylinder 3 is an extrusion piston 5. This piston is hydraulically operated by a double-acting ram comprising a piston 6 carried on a rod 7 fast with the piston 5, and a cylinder 8 in which the piston 6 works, the cylinder 8 having a port 9 above the piston 6 and a second port 10 below this piston. When working fluid under pressure is admitted to the cylinder by way of port 9 the piston is driven downwardly (i.e. through its working stroke) and when working fluid under pressure is admitted to the cylinder by way of port 10 the piston is driven upwardly (i.e. through its return stroke), the fluid acting in the first case upon the top of the piston and in the second upon the underside thereof.

Figure 3 shows the tube of material completely extruded from the accumulator cylinder 3, the extrusion piston 5 having completed its downward (working) stroke, and the mould halves, which are marked 11, 12, in their retracted (mould-open) positions in readiness to close around the tube, which is marked 13.

Figure 4 shows the mould halves 11, 12 in their mould-closed positions, the halves having at the end of their movement to these positions cut off an excess portion 14 of the tube 13 from the remainder thereof and then united the edges of the tube at the cut. This figure also shows, as already remarked, the tube in the expanded condition thereof, the tube having been inflated by a gaseous medium (e. g. air) under pressure injected into it subsequently to the closure of the mould by way of a nozzle 15 extending into the throughway of the die 4 concentrically therewith. As shown, the tube is forced by the inflating medium into intimate and uniform contact with the interior surface of the closed mould, whereby it is caused to assume, as to its exterior surface, the exact shape of the interior surface of the mould.

As indicated in Figure 5, the hydraulic actuating means for the mould halves consist in the case of each mould half of a double-acting hydraulic ram. This ram comprises a double cylinder element 17, which is stationary, and two piston elements 18, 19 connected, in stationary relation to one another, to the mould half 12, the element 18 directly and the element 19 by coupling rods 20. Piston element 18 is of larger diameter than piston element 19. Consequently if hydraulic fluid under pressure is being supplied to the left hand cylinder space 21 and simultaneously, at the same pressure, to the right hand cylinder space 22, the effect will be that the thrust of the fluid upon piston element 19, which otherwise would tend to move the mould half-cylinder element unit to the right, i.e. in the mould-opening direction, will be overpowered by the superior thrust upon piston 18, with the result that the said unit will be moved to the left, i.e. in the mould-closing direction, the fluid under pressure being expelled out of the cylinder element 22 back into the supply line for the fluid. If, however, hydraulic fluid under pressure is being supplied to the right hand cylinder space 22 and the left hand cylinder space 21 is opened to discharge, the effect will be that the thrust of the fluid upon piston element 19 will move the mould half-cylinder element unit to the right, i.e. in the mould-opening direction, the fluid thereby displaced from the cylinder space 21 flowing away to discharge. The control unit illustrated in Figures 9, 10 and 11 is designed to control the flow of hydraulic fluid to and from the cylinder spaces 21, 22 in such a manner as to give the above described effects. This will appear later.

Referring now to Figures 6, 7 and 8, it will be seen that according to the modification of the apparatus illustrated in these figures, the extrusion piston 5 of the apparatus is formed with a cylindrical cavity 23 which when the piston is at its bottom-of-stroke position (Figures 6 and 7) is opposite the inlet of the plastifier-extruder, with the result that the interior space of the accumulator cylinder 3 (which interior space includes of course said cavity 23) is at all times (even when the piston 5 is at the bottom of its working stroke) in open communication with the plastifier-extruder.

With such an arrangement, as will be readily understood, the plastified material flowing into the cylinder 3 from the plastifier-extruder and accumulating therein between successive down strokes of the extrusion piston 5, exerts an upward thrust upon the piston effective to raise the piston through its return (upward) stroke, i.e. to the position in which it appears in Figure 1. In the form of the apparatus illustrated in Figures 1 to 4 the piston is raised hydraulically as already described. It is found that, generally speaking, the modified arrangement (Figures 6, 7 and 8) is the preferred arrangement.

It will also be seen from Figure 8, that according to a further modification of the apparatus otherwise as described above with reference to Figures 1 to 4, the mould halves carry at the top thereof a pair of blade-like projections 24, 25 which as the mould halves come finally together cut through the tube 13 immediately beneath the outlet of the tubing die 4 so as to sever the tube, now enclosed within the mould, from the mass of plastified material occupying the throughway of the die, the projections 24, 25 co-operating in this action with the outer surface of the nozzle 15, which for this purpose projects a short distance from the outlet of the die in the manner clearly shown in said Figure 8, so as to lie opposite (radially of the nozzle) the paths of the projections and therefore in a position in which the projections can effect their tube severing action against the reaction of the said surface of the nozzle.

Referring now the hydraulic control unit shown in Figure 10, the unit comprises eight valves 26, 27, 28, 29, 30, 31, 32, 33, actuated by tappets. These tappets are raised or lowered in synchronism according to their position relatively to the valve lifters, shown in Figure 10 as screws 26a, 27a, 28a, 29a, 30a, 31a, 32a, 33a.

Figure 9 illustrates the system in this respect. As shown in this figure, the valves A and B, which function as completely opened or completely closed cocks, according to the position of the valve relatively to its seat C, are lifted by screws D and E having different effective heights H and H1 in dependence upon the position of the screws in the cross head F, i.e. the extent to which they are screwed into the crosshead and therefore the extent to which they project from the crosshead towards the lower ends of the respective tappet rods G, G1. Rocking movement of the crosshead F, which latter is mounted for such movement on a shaft F1 carried on bearings F2, produces a raising movement of the screw D and a lowering movement of the screw E (assuming the rocking movement is clockwise in Figure 9). Such raising and lowering movements produce in turn lifting (opening) and lowering (closing) movements of the respective valves A and B, the valves being lifted against the downward thrust of closing springs J.

In the typical case shown in Figure 10, the four valves 26, 27, 28, 29 control the hydraulic part of the control system, i.e. the part relative to the two hydraulic double-acting rams which actuate the mould halves and the ram 6, 7, 8 (Figure 1) which actuates the extrusion piston 5 working in the accumulator cylinder 3, it being assumed that the arrangement shown in Figure 10 is designed for use with the modified form of the apparatus according to Figures 6, 7 and 8, in which the extrusion piston and associated ram 6, 7, 8 are raised by thrust from the plastified material accumulating in the cylinder 3 in the manner above described. The other four valves 30, 31, 32, 33 control the pneumatic part of the system, valves 30 and 31 controlling the flow of air under pressure to and from the tube inflation nozzle 15 of the apparatus and valves 32 and 33 controlling the flow of air under pressure to and from an air-actuated clutch (not shown in the drawings) for starting and stopping (only when necessary) the plastifier-extruder of the apparatus.

The lifters 26a to 32a are arranged in pairs, each pair being mounted on a crosshead (F, Figure 9). There are therefore four crossheads and these are individually adjustable, in an angular sense, about the axis of the shaft (F1, Figure 9) carrying them. With such an arrangement it is possible to provide for any desired or necessary sequence of opening and closing of the eight valves by suitably adjusting (a) the respective positions of the lifters axially thereof relatively to the crossheads and (b) the respective angular settings of the crossheads about the axis of the shaft (F1).

The sequence indicated in Figure 10, which visualises the phase in the cycle of operation of the apparatus in which (1) the mould is closed, (2) air is being blown into and extruded tube and (3) the extrusion piston is rising under thrust from the plastified material accumulating in the cylinder 3, is one in which the valves are in the following positions:

Valve 26 closed and valve 27 open—thereby (a) cutting off the discharge of hydraulic working fluid from the cylinder spaces 22 of the mould ram cylinder elements (Figure 5) and (b) admitting hydraulic working fluid under pressure to the cylinder spaces 21 of the mould ram cylinder elements;

Valve 28 open and valve 29 closed—thereby (c) opening a path of discharge of hydraulic working fluid from the space above the ram piston 6, 7 and (d) cutting off the supply of hydraulic working fluid under pressure to this space;

Valve 30 open and valve 31 closed—thereby (e) opening a path for the supply of air under pressure to the extruded tube by way of the inflation nozzle 15 and (f) cutting off a path of discharge of the air from the tube.

Valve 32 closed and valve 33 open—thereby (g) permitting discharge of air under pressure for actuating a clutch for rotating the plastifier-extruder of the apparatus, said clutch, which is not shown in the drawings, serving to control the rotation of the plastifier-extruder, and (h) permitting discharge of air under pressure for actuating a clutch for stopping the plastifier-extruder (only in a case where this should be necessary).

The operation of the apparatus is as follows:

The plastifier-extruder compresses and accumulates the plastified material into the cylinder 3 and by the action of piston 5 the material is periodically extruded from the cylinder in the form of a tube 13 possessing the requisite properties to enable it to be inflated into intimate contact with the interior surface of the closed mould.

The mould halves 11, 12 are simultaneously moved by their respective rams towards the mould-closed position and at the end of this movement they cut off an excess portion 14 of the extruded tube and unite the edges of the tube at the cut.

Piston 5 returns to its raised position (Figure 4) under thrust from the plastified material accumulating in the cylinder 3 (assuming the case of the modified form of the apparatus illustrated in Figures 6, 7 and 8) and immediately upon completion of closure of the mould air under pressure is admitted into the tube, now enclosed by the mould, through nozzle 15, causing the tube to inflate in the manner and with the effect above described.

The mould then opens to permit extraction of the moulded article from the space between the two mould halves, now in retracted position, whereupon a fresh cycle is commenced.

As remarked, the plastifier-extruder operates continuously and therefore during the downward (working) and return strokes of the piston—when, in the case of the form of the apparatus illustrated in Figures 1 to 4 in which during a part of these strokes of the piston, actual delivery of material into the cylinder is cut off. Said strokes, however, only occupy a few seconds and the return stroke follows the downward stroke without any substantial interval. Consequently the interval of cut off of said actual delivery is only momentary, with the result that the extruder can operate continuously without any difficulty arising from the cut off. It is again pointed out, however, that the generally preferred form of the invention is the said modified form illustrated in Figures 6, 7 and 8, and in this form, the interior space of the cylinder 3 below the piston 5 being at all times in uninterrupted communication with the outlet of the plastifier-extruder, there is no cut-off in the delivery of material into the cylinder.

If desired, means can be included in the apparatus effective to ensure the obtaining of extruded tubes (to be inflated in the closed mould of the apparatus) having a uniform thickness.

The system which is provided by the present invention has the following important advantages:

(1) The possibility of producing hollow articles of substantial size and weight in the sense hereinbefore indicated.

(2) Production is increased and the over-all time required for the operation cycle is reduced owing to the continuous operation of the extruder; extrusion under pressure (i.e. during the downward and return strokes of the extrusion ram piston) occurring in the cycle for only a very brief interval.

(3) In consequence of (2), all drawbacks resulting from non-uniform cooling and stretching of the tube of plastified material during its extrusion, due to the relatively large size of the tube, are eliminated.

(4) Extruders of relatively small capacity as compared to the size of the extruded tube may be employed, owing to the effect of accumulation of the plastified material in the accumulator cylinder between successive downward (working) strokes of the extrusion piston working in that cylinder.

If desired, the invention may take a form in which a plurality of moulded objects are produced simultaneously by the employment of a mould having a plurality of cavities associated with a corresponding plurality of extrusion dies forming the outlet of the accumulator cylinder, the arrangement being such that a corresponding plurality of tubes are simultaneously extruded from the cylinder into a position of register laterally of the tubes, each with a corresponding cavity of the mould, which is thereupon closed around the tubes, the latter being thereupon inflated into contact with the interior spaces of the mould in the manner hereinbefore described.

What I claim as my invention and desire to secure by Letters Patent of the United States is:

1. An apparatus for producing containers of large size by the blow-molding method, said containers being composed of a thermoplastic material, comprising a worm type plastifier-extruder which operates continuously during the molding process, an accumulator cylinder communicating with the end of said extruder for accumulating the plastic from the extruder and having a piston therein whose periphery contacts the wall of said cylinder, a tubing die communicating with said accumulator cylinder and having its orifice axis vertical, said piston being operative at each stroke in one direction to eject through said die, so that it forms a tube depending therefrom and open at its lower end, a quantity of plasticized material from said interior space exceeding that required to form the container, means for moving said piston sufficiently rapidly through its material ejecting stroke to insure that said tube is formed at a rate substantially exceeding the delivery rate of the extruder, a split mold located in the path of delivery of the plastic from said die, means for holding the portions of the split mold apart during the ejecting stroke of said piston, means including a nozzle associated with the tubing die for injecting fluid under pressure into the extruded tube through said die to expand the tube into intimate contact with the interior surfaces of the mold, and means on the mold sections effective to cut off an excess portion of the tube at the lower end thereof and simultaneously unite the edges of the tube adjacent said lower end when the portions of the split mold are brought together.

2. A blow-molding apparatus according to claim 1, wherein said means for moving the piston moves the piston such that one end of the piston reaches a point beyond the point of entry of the plastic from the extruder and adjacent said nozzle when the piston is at the end of its material ejecting stroke.

3. A blow-molding apparatus according to claim 1, wherein said means for moving the piston through its material ejecting stroke is power-operated and wherein said apparatus includes power-operated means for closing the mold, means for controlling said injection of fluid under pressure into the tube and timer means for controlling said piston moving means, said power-operated mold-closing means and said fluid injection controlling means whereby the fluid is admitted into the tube following closure of the mold and before any portion of the tube has had an opportunity to cool sufficiently to interfere with satisfactory molding of the tube.

4. A blow-molding apparatus according to claim 1, wherein said piston at the end thereof nearer said die is formed with a recess which is in continuous communication with said extruder and also with said interior space, said mold including means for closing the end of the tubing die when said mold is closed, whereby the return stroke of the piston, following said material ejecting stroke, is produced by the thrust exerted upon the piston at said end thereof by the plasticized material fed from said extruder, the main part of the piston being at all times clear of the point of entry of the plastic from the extruder while a portion of the piston at said end thereof toward said interior space of the cylinder moves in said material ejecting stroke to a point below said point of entry.

5. A blow-molding apparatus according to claim 1 having means on the upper end of the mold effective to close the end of the tubing die.

References Cited in the file of this patent

UNITED STATES PATENTS

| | | |
|---|---|---|
| 2,564,203 | Hendry | Aug. 14, 1951 |
| 2,632,202 | Haines | Mar. 24, 1953 |
| 2,724,860 | Strong | Nov. 29, 1955 |
| 2,737,686 | Harkenrider | Mar. 13, 1956 |

FOREIGN PATENTS

| | | |
|---|---|---|
| 495,105 | Belgium | Apr. 29, 1950 |